United States Patent [19]
Yates

[11] 3,718,491
[45] Feb. 27, 1973

[54] PROCESS FOR SILICATE-PERLITE STRUCTURES

[75] Inventor: Paul C. Yates, Wilmington, Del.

[73] Assignee: E. I. du Pont de Nemours and Company, Wilmington, Del.

[22] Filed: Feb. 19, 1971

[21] Appl. No.: 117,109

Related U.S. Application Data

[63] Continuation-in-part of Ser. No. 744,297, July 12, 1968, abandoned.

[52] U.S. Cl. ..............................106/84, 106/DIG. 2
[51] Int. Cl. .............................................C04b 43/00
[58] Field of Search......................106/74, 84, DIG. 2

[56] References Cited
UNITED STATES PATENTS

| | | | |
|---|---|---|---|
| 2,447,725 | 8/1948 | Adams et al. | 106/84 |
| 2,600,812 | 6/1952 | Thomas | 106/84 |
| 2,756,159 | 7/1956 | Kendall et al. | 106/84 |
| 2,914,413 | 11/1959 | Mercer | 106/84 |
| 3,522,067 | 7/1970 | MacArthur | 106/84 |

*Primary Examiner*—James E. Poer
*Attorney*—James L. Jersild

[57] ABSTRACT

Water resistant silicate-perlite insulation materials are made by mixing an aqueous solution of an alkaline ionic silicate and a colloidal amorphous silica sol, adding perlite to said mixture, molding the combined mixture into the desired shape and exposing said shaped article to an acidic substance to set the article rapidly and provide immediate water resistance.

7 Claims, No Drawings

PROCESS FOR SILICATE-PERLITE STRUCTURES

CROSS-REFERENCE TO RELATED APPLICATION

This application is a continuation-in-part of copending application Ser. No. 744,297, filed July 12, 1968, now abandoned.

BACKGROUND OF THE INVENTION

Because of the serious health hazards in handling asbestos, a commonly used insulating material, there is a need to provide a substitute material which insulates as well as asbestos, is easily and safely handled and is inexpensive. This invention provides an efficient process for molded articles of perlite-silicate mixtures which meet the requirements for replacing asbestos insulation.

The general procedure of bonding insulating materials with silicates is well known to the art. A representative prior art disclosure is given in Soluble Silicates, Their Properties and Uses, J. G. Vail, Reinhold Publishing Co., New York, N.Y. (1952). The bonding of silicates with $CO_2$ for sand cores and the use of esters as a latent acid source for the preparation of silicates in the acid-resistant cements is also found in the art. Adams et al., U.S. Pat. No. 2,447,725, Seybold, U.S. Pat. No. 2,705,198 and Mercer, U.S. Pat. No. 2,914,413 disclose that sodium silicate may be used as a binder with acid or latent acid setting agents. However, none of these references teach a process taking advantage of controlled rapid gelling of silicate to form stable structures which are immediately water resistant without prolonged curing or ageing. Indeed, the Seybold reference teaches the use of very dilute silicate solutions to avoid gelation. Thus the sodium silicate binder is precipitated by the acid rather than gelled. Other references teach the use of sodium silicate solutions as a binder using salts or bases to alter the solubility of the silicate and causing it to "salt out" of solution. These binders will not be water-insensitive. The silicate binder remains as a sodium salt unlike the acid precipitated binders.

This invention, unlike the references, takes advantage of the gelation of ionic silicate perlite mixtures by acids and provides a process which produce rapid and uniform setting throughout the silicate-perlite structures of this invention. This allows the set structures to be easily handled prior to drying and eliminates the need for an intermediate dewatering step. The resulting products are strong and extremely water-insensitive.

SUMMARY OF THE INVENTION

Water resistant molded articles such as insulating materials are made by the process of this invention. From 1 to 3.5 parts by weight of perlite are mixed with from 4 to 1 parts of an aqueous siliceous binder solution. The binder solution contains an ionic silicate such as lithium, potassium, sodium, guanidinium or quaternary ammonium silicate. The solution may also contain amorphous colloidal silica. The colloidal silica may provide from 0 to 90 percent of the silica in the binder solution with the remainder, from 10 to 100 percent, being present as ionic silicate. The solution has a total silica content of from 10 to 40 percent by weight resulting in a finished product having from about 5 to 60 percent of its weight as silica. The total volume of fluid in the mixture is less than 75 percent of the void volume of the perlite. This includes the volume of both external voids between perlite particles and void spores within the perlite particles. The mixture is poured into a mold and rapidly set by acidification. The finished product is produced by drying the molded and set article.

DESCRIPTION OF THE PREFERRED EMBODIMENTS

The first ingredient required by this process is perlite, a porous particulate refractory insulating material. This material upon being packed or vibrated under approximately one atmosphere pressure in excess of normal atmospheric pressure generally has a bulk density of less than 20 pounds per cubic foot.

A second essential ingredient in the process of this invention is a siliceous binder phase derived from an aqueous solution containing a dissolved alkaline ionic silicate selected from the group of lithium, potassium, sodium, guanidinium, and quaternary ammonium silicates, or mixtures thereof. Also useful is a mixture of such a silicate with a colloidal amorphous silica sol having a particle size of from 2 to 100 millimicrons. Typical commercially available sols useful here are Ludox HS, SM, TM, etc., Nalcoag and Syton. The silicate-silica sol mixture ratio in the insulation composition should be compounded to give at least 10 percent by weight of the total silica in the binder phase as originating from the alkaline ionic silicate. The amount of silica solids from the binder phase must be adjusted within the limits of 5 to 60 percent by weight based on the weight of the total insulation. It is preferred that the concentration of silica be in the range of from 10 to 40 percent by weight and more preferably 20 to 40 percent by weight. The guanidine silicate can be prepared as disclosed in U.S. Pat. No. 3,475,375.

In those applications where the maximum refractory characteristics are not necessary, such as insulating materials which must operate at temperatures no higher than 800°C., the cheaper and more commonly manufactured alkali metal silicates, such as sodium, potassium, or lithium, are preferred. However, in those applications in which the maximum refractory properties are desired, one of the organic silicates, such as guanidinium silicate, is the preferred species. In such refractory applications, the guanidinium ion or other organic ions, such as quaternary ammonium ion from a quaternary ammonium silicate, is thermally decomposed and a residue of pure amorphous silica remains.

In addition to the above mentioned ingredients, the compositions of the invention may also contain various water-soluble binders which are compatible with ionic silicate solutions, including sodium carboxymethyl cellulose, polyvinyl alcohol and similar materials. Various pigments may also be added to modify the physical appearance of the compositions of the invention as well as materials such as carbon black or metal flakes to change the electrical or thermally-conducting properties of the compositions of the invention. In addition, wetting agents may be present in nominal amounts to facilitate the wetting of the surfaces of refractory particulate fillers by the ionic silicates of the invention.

One of the setting agents useful in this process is formamide. It hydrolyzes in the alkaline binder solution forming formic acid and ammonia resulting in gelation of the silicate binder. It is preferred that the formamide be incorporated in an amount ranging from about 5 to 400 mole percent based on the number of moles of alkali cations associated with the alkaline ionic silicates in the binder solution. Formamide will hydrolyze slightly at room temperature but more rapidly at elevated temperatures. This permits thorough and uniform mixing of the formamide setting agent into the silicate-perlite mixture before gelation occurs. A slight temperature elevation will then cause rapid, complete and uniform gelation throughout the mixture.

Gaseous acidic materials may also be employed to bring about the rapid gelation of the compositions of the invention and carbon dioxide is highly preferred for this purpose. In some instances, it will be found preferable to employ both formamide and carbon dioxide gas. In such instances, the carbon dioxide gas brings about the immediate gelation of the alkaline ionic silicate ingredient, whereas the formamide upon subsequent heating or upon passage of time at room temperature, further neutralizes the alkaline silicates, producing a silica gel and the formate salt of the alkaline cation and the anion resulting from the hydrolyzed formamide. Insulation prepared in this way combines the advantages of exceedingly rapid set, achieved by exposure to the gaseous acid, with excellent water resistance resulting from further neutralization of the alkaline constituents of the silicate by the formamide.

As previously noted, binder compositions employed in the process of this invention may contain colloidal amorphous silica in admixture with the essential alkaline ionic silicates of the invention. In general, the colloidal amorphous silica joins the gel network which is produced as a result of the destabilization of the alkaline ionic silicate and, if present in substantial quantities, assists in minimizing the shrinkage of the bond formed upon gelation.

Too great a substitution of the total silica content of the bond by amorphous silica is not desirable, however, since the bonding capacity decreases approximately linearly as alkaline ionic silicate is substituted by an equal weight of silica in the form of colloidal amorphous silica. For this reason, it is not usually preferred to substitute more than 90 percent of amorphous silica in colloidal form for the silica originating from alkaline ionic silicate.

It will be noted, however, that the refractory characteristics of the bond, as well as its water resistance, are improved as colloidal amorphous silica is substituted for alkaline ionic silicate because of the lower salt content of such compositions and the higher ratio of silica to salt produced as a result of the neutralization reaction. Since colloidal amorphous silica sols are substantially more expensive than alkaline ionic silicates, the economic factors involved must be balanced against these improved refractory and solubility characteristics. In general, it is desirable to use only as much colloidal amorphous silica as may be necessary to achieve the requisite refractory character and water insensitivity.

Insolubilizing agents of various sorts may also be added to improve the water resistance of the resulting bonded insulated material. For example, constituents such as zinc oxide, calcium oxide, magnesium oxide, as well as calcium and magnesium silicate can be added in small amounts to increase the water resistance of the final bonded body.

PROCESSES OF THE INVENTION

A critical aspect of the process of this invention is that of controlling both the viscosity and the amount of fluid phase. These must be so adjusted as to minimize the absorption of silica-silicate fluid into the internal structure of the refractory particulate perlite. Thus, the viscosity must be sufficiently high to prevent penetration of the binder into the fine pores of the perlite particles. Excessive absorption of the bonding material into the structure usually results in a needless increase in the weight of the perlite with no corresponding increase in the strength of the bonded body. Excessive amounts of a fluid bonding phase can even lead to very undesirable packing into dense masses of bonded perlite.

In general, the amount of fluid bonding phase to be employed should be just sufficient to render the refractory particles cohesive and moldable. The required amount can be determined by using the binder fluid in the standard Oil Absorption Test-ASTM No. D 1483-60 or D 281-31. These tests involve mixing an oil (in this invention the binder fluid itself would be used) with a weighed amount of the porous refractory powder until the mixture is no longer crumbly but just becomes cohesive with the appearance of rather large lumps of particulate material in the normally dry appearing composition. Generally the aqueous siliceous binder to perlite weight ratio is about 4:1 to 1:3.5.

The correct amount of fluid to be employed will depend on the nature of the particulate material to be bonded and upon the viscosity of the binder. The viscosity can vary substantially with the concentration of alkaline ionic silicate and with the ratio of silica to alkali cation present in the silicate, and is also strongly influenced by the presence of colloidal amorphous silica. Thus, it is not possible to give precise predictions of the correct amount of fluid phase to be employed. In general, the fluid phase should not exceed about 75 percent of the combined internal and external void space of the perlite when it is packed into a random close-packed configuration by vibrating under approximately 1 atmosphere pressure. Preferably, the amount of fluid phase will be somewhat less than this but since this varies with the factors previously discussed, such as the viscosity of the fluid phase, the absorption characteristics of the perlite and so forth, the method previously described can be used to determine the proper amount of fluid phase.

As noted, it is usually desirable to have a fairly viscous fluid phase in order to avoid excessive absorption of the bonding phase into the interior regions of the perlite where it contributes little to the bond. Some absorption is, of course, desirable since this is required to establish good adhesion between adjacent particles. The viscosity of the binder solution may be varied either by varying the concentration, or the ratio, of the ionic silicate or the amount of colloidal silica added.

Viscosity can also be controlled by the addition of certain thickening agents. Bentonite clay in a dispersed form is a satisfactory thickening agent, as is finely divided chrysotile asbestos. Organic thickening agents may also be employed, thus sodium carboxymethyl cellulose or various polysaccharides, such as algin, which is derived from seaweed and is commercially available, can be used. Combinations of organic and inorganic thickening agents may also be employed.

Wetting agents can be added if needed to increase the contact between binder fluid and the particulate refractory. Any of the common anionic or nonionic agents are effective. However, excessive wetting and penetration of the binder into the interior pores of the perlite is to be avoided in order to maintain the desired low bulk density of the refractory insulation. Thus the contact angle between binder fluid and surface of the perlite must be significantly less than 180° (no wetting) yet greater than 0° (complete wetting and loss of low density properties).

Following mixture of the refractory particulate material with one of the alkaline ionic silicates or silicate-silica sol mixtures of the invention in a suitable quantity, as described above, the composition may be molded into any desired shape and set into a rigid structure by exposure to carbon dioxide gas.

A second preferred way of achieving a rigid shape is to mix formamide with the alkaline ionic silicate constituent and to mix this in turn with the perlite. This can then be molded into the desired shape under a pressure normally not exceeding 15 lbs./sq. in. in excess of atmospheric pressure, and the resulting body brought to a temperature sufficient to bring about the hydrolysis of the formamide accompanied by the partial neutralization and gelation of the ionic silicate.

The most highly preferred setting agent combination is one which includes both formamide and carbon dioxide since such a procedure combines the advantages of exceedingly rapid set without the necessity of high temperatures, with more complete neutralization than is possible with the relatively weakly acidic carbon dioxide as the sole acidic constituent.

Following partial neutralization, either accomplished by carbon dioxide or by thermally hydrolyzing formamide, or both, the compositions of this invention can be dried at elevated temperatures, leading to virtually no shrinkage during the drying process. In this they differ substantially from bonded particulate masses of the prior art which have not been pre-set into rigid configuration. The compositions are immediately water resistant and do not lose appreciable strength after boiling in water for 4 days.

As previously noted, the most refractory compositions contain organic-based alkaline ionic silicates which, upon thermal decomposition of the organic cation, result in a pure amorphous silica bond of very high temperature capability.

The preferred products of this invention are insulating materials which are prepared from said particulate and a binder containing colloidal amorphous silica sol and at least 10 percent by weight of the binder of an alkaline ionic silicate. The compressive strength of the insulating material is about 20 to 50 pounds per square inch at 5 percent deformation with a water resistance of less than 10 percent weight loss upon boiling for four days. The material should also have a thermal conductivity of about 0.3 to 0.5 BTU's per hour per square foot per inch of thickness per degree of Fahrenheit temperature difference.

The products prepared by this invention are excellent insulating materials. The mixed composition can be poured into a suitable mold and then set to form insulated articles such as insulated pipes and insulated refrigeration or oven components.

The following examples further illustrate the invention. Parts and percents are by weight unless otherwise noted.

EXAMPLE 1

Sixty parts of Du Pont's "Ludox" HS, a sodium stabilized colloidal silica aquasol containing 30 percent silica of an average particle size of 15 m$\mu$, and having a pH of 9.8 and a $Na_2O$ to $SiO_2$ weight ratio of 1:95, is mixed with sixty parts of Du Pont's potassium silicate Grade No. 865 containing 26.25 percent silica and 12.45 percent $K_2O$.

With slow stirring the mixture is added to one hundred parts of ultra-fine expanded perlite having a density of 2.5 lb./ft.$^3$. After mixing for thirty seconds, two test specimens are formed in a mold by hard hand packing and then exposed to $CO_2$ for 10 minutes.

By this procedure is obtained a quick-set low density refractory insulation. A sample dried one-half hour at 100°C. has a density of about 8 lbs/cubic foot, a crush strength at 5 percent deformation of 33 pounds per square inch and a thermal conductivity at 300°F. mean temperature of 0.35. A set but undried sample has good water sensitivity after a 4-day boil period and under severe conditions of an 8-day boil period shows only about a 30 percent weight loss.

EXAMPLES 2-9

Example 1 is repeated substituting for the potassium silicate an equivalent amount of the indicated silicates. Similar quick setting low density refractory insulation is obtained in each case.

| Example | Silicate |
|---|---|
| 2 | Potassium silicate with wt. ratio of $SiO_2:K_2O$ — 2.07 |
| 3 | Potassium silicate with wt. ratio of $SiO_2:K_2O$ — 1.80 |
| 4 | Sodium silicate with 4.5 wt. ratio of $SiO_2$ to $Na_2O$ |
| 5 | Sodium silicate with 3.25 wt. ratio of $SiO_2$ to $Na_2O$ |
| 6 | Lithium Polysilicate with 4.8 mol ratio of $SiO_2$ to $Li_2O$ |
| 7 | Lithium Polysilicate with 8.5 mol ratio of $SiO_2$ to $Li_2O$ |
| 8 | Guanidine Silicate — 20% $SiO_2$ and with $SiO_2$:guanidine mol ratio = 1 |
| 9 | Tetramethyl ammonium silicate with $SiO_2$:tetramethyl ammonium hydroxide mol ratio = 1. |

EXAMPLE 10

Example 1 is repeated using 60 parts of Du Pont's "Ludox" SM, a sodium-stabilized colloidal silica aquasol containing 15 percent silica of an average particle size of 7 m$\mu$, and having a pH of 8.5 and a $Na_2O$ to $SiO_2$ weight ratio of 1:150.

As in Example 1 an outstanding quick-set refractory insulation material is formed.

EXAMPLE 11

The procedure of Example 1 is repeated using 60 parts of Du Pont's "Ludox" AS, an ammonia-stabilized colloidal silica aquasol, containing 30 percent silica, and having a pH of 9.6.

After mixing, a stable quick-set refractory insulation material is formed.

EXAMPLE 12

By the procedure of Example 1, 60 parts of Du Pont's "Ludox" AM, an alumina-modified colloidal silica aquasol containing 30% $SiO_2$ and having a pH of 9.0 is used to make the refractory insulation.

EXAMPLE 13

Example 13 is repeated adding an equivalent amount of formamide to the alkali present in the silicate, treating with $CO_2$ to set the mixture and finally warming the mixture to 50°C. to promote hydrolysis of the formamide which provides extra green strength in the set mixture.

EXAMPLE 14

A mixture consisting of 25 parts formamide and 60 parts water is added to 200 parts of Du Pont's sodium silicate Grade No. 9 containing 29.00 percent silica and 8.90 percent $Na_2O$ and the resulting mixture is heated to a temperature of 45°C. on a steam bath. This binder solution is added to 120 parts of ultra-fine perlite having a density of 2.5 lb./cu.ft. A further addition of 180 parts water is then blended into the binder-perlite system. Specimens are molded and subsequently dried in air.

By this procedure is obtained an insulation product having a density of about 16.7 lb./cu.ft.

The molded specimen can be oven heated to 50°C. to give similar results.

EXAMPLE 15

A mixture consisting of 25 parts formamide and 60 parts water is added to 200 parts of Du Pont's potassium silicate Grade No. 865 containing 26.2 percent silica and 12.45 percent $K_2O$ and the resulting mixture is heated to a temperature of 45°C. on a steam bath. This binder solution is added to 120 parts of ultra-fine perlite having a density of 2.5 lb./cu.ft. A further addition of 180 parts water is then blended into the binder-perlite system. Specimens are molded and dried in air.

By this procedure is obtained an insulation product characterized by a density of about 16 lb./cu.ft.

The molded specimen can be oven heated at 50°C. to give similar results.

EXAMPLE 16

A mixture consisting of 25 parts formamide and 60 parts water is added to 290 parts of water solution of guanidine silicate (prepared as in Example 1 of U.S. Pat. No. 3,475,375, containing ~ 20 percent silica solids and the resulting mixture is heated to a temperature of 45°C. on a steam bath. This binder solution is added to 120 parts of ultra-fine perlite having a density of 2.5 lb./cu.ft. A further addition of 180 parts of water is then blended into the binder-perlite system. Specimens are molded and dried in air or in an oven heated to 50°C. temperature.

By this procedure is obtained an insulation product characterized by a density of about 20 lb./cu.ft.

EXAMPLE 17

Example 16 is repeated substituting for the quanidine silicate an equivalent amount on the basis of silica content of lithium polysilicate solution.

I claim:

1. A process for preparing a water resistant molded article which comprises mixing 1 to 3.5 parts perlite and 4 to 1 parts of an aqueous binder solution containing silica, the silica being present as 0 to 9 parts colloidal silica and 10 to 1 parts of at least one alkaline ionic silicate selected from lithium silicate, potassium silicate, sodium silicate, guanidinium silicate or quaternary ammonium silicate, the silica being present in an amount to give about 5 to 60 percent of the combined weight of perlite and binding silica, the fluid volume being less than 75 percent of the internal and external void space of the perlite, pouring said mixture into a mold, rapidly setting said mixture by acidification with $CO_2$, formamide or mixtures thereof, and drying the article.

2. The process of claim 1 where acidification is accomplished with carbon dioxide.

3. The process of claim 1 where acidification is accomplished with formamide.

4. The process of claim 3 where said formamide is present in a ratio with the alkaline ionic silicate cations of from 1:20 to 4:1.

5. The process of claim 1 wherein the aqueous siliceous binder contains from 10 to 40 percent silica by weight.

6. The process of claim 1 wherein the aqueous siliceous binder contains from 20 to 40 percent silica by weight.

7. The process of claim 5 wherein at least 10 percent but not more than 90 percent by weight of the silica is present as amorphous colloidal silica.

* * * * *